United States Patent Office 2,733,129
Patented Jan. 31, 1956

2,733,129

COPPER HEMICHROMITE AND ITS PREPARATION

Herrick R. Arnold, Wilmington, Del., assignor to E. I. du Pont de Nemours and Company, Wilmington, Del., a corporation of Delaware No Drawing. Application November 5, 1953, Serial No. 390,429

3 Claims. (Cl. 23—56)

This invention relates to a new composition of matter and to its preparation. More particularly this invention relates to a new copper chromium oxide composition and its preparation.

Copper chromite is a technically important hydrogenation catalyst because of its selective activity for converting carboxyl groups to methylol groups. As disclosed in U. S. Patent 1,746,782, there are various ways for making catalytically active copper chromite but one of the most useful is the spontaneous thermal decomposition of the copper ammonium chromate obtained by reacting in equimolar proportions ammonium chromate with a water-soluble copper salt. X-ray examination of this copper chromite shows a characteristic line pattern corresponding to cupric chromite, $CuCr_2O_4$, except for the presence of a 4.79 line and the absence of a 4.87 line found in the know pattern of cupric chromite.

Another copper chromium oxide composition is the product obtained according to U. S. Patent 2,512,653 by pasting cupric acetate with chromium trioxide in acetic acid, thermally decomposing the composite, extracting with an aqueous ammonium hydroxide-ammonium nitrate solution, and then reducing at atmospheric pressure with hydrogen at about 400° C. X-ray analysis shows lines characteristic of cuprous chromite, $Cu_2Cr_2O_4$, with paramagnetic resonance absorption extending from 186° C. to −193° C. (80° K., liquid nitrogen) and with no anti-ferromagnetism within this temperature range.

An object of this invention is to provide a new composition of matter and method for its preparation. A further object is to provide a new copper chromium oxide composition and method for its preparation. Other objects will appear hereinafter.

These objects are accomplished in accordance with the present invention by providing the new composition copper hemichromite which corresponds in gross analysis to $CuCrO_2$ and is characterized by a transition temperature of 25–35° C. above which temperature it is paramagnetic and below which temperature it is anti-ferromagnetic, said copper hemichromite being the product obtained by heating at 400° to 475° C. an intimate mixture of a copper carboxylate with chromium trioxide, followed by reduction of the calcined product with hydrogen at 425° to 475° C.

This new anti-ferromagnetic composition comprises both amorphous and crystalline phases, shows a definite diffraction line pattern different from that corresponding to cuprous chromite, $Cu_2Cr_2O_4$, as determined by X-ray analysis, and only part of its copper is extractable with dilute hydrochloric acid.

The example which follows is submitted to illustrate and not to limit this invention. Catalyst surface area is determined by the procedure described by P. H. Emmett in a paper entitled "A new method for measuring the surface area of finely divided materials and for determining the size of particles," which appeared in Am. Soc. for Testing Materials, March 4, 1941, Symposium on New Methods for Particle Size Determination in the Sub-Sieve Range.

EXAMPLE

An equimolar mixture of cupric acetate [200 g. of $Cu(C_2H_3O_2)_2.H_2O$] and chromium trioxide (100 g. $CrO_3$) is dissolved in 750 cc. of water and evaporated to dryness with stirring on a steam bath. The brick red dry solid is powdered, heated in small portions in an open dish at 400° to 450° C. and finally heated in an electric furnace for several hours at 400° C. The calcined product is a very finely divided black powder, analyzing 41.12% copper, 33.03% chromium, and 25.85% oxygen (by difference). From this analysis, it is calculated that this product corresponds essentially to $CuCrO_{2.5}$.

The black powder obtained as above is reduced by heating it from room temperature to 450° C. during a period of 14 hours in an 80% $N_2$/20% $H_2$ gas mixture at a space velocity of 1000 reciprocal hours, followed by heating at 450° C. for 2.5 hours in pure hydrogen at a space velocity of 1000 reciprocal hours. The reduced product is brown and analysis shows it to contain 43.50% copper, 35.40% chromium, and 21.10% oxygen (by difference). This analysis corresponds essentially to a product of empirical formula $CuCrO_2$ for which the calculated percentages are 43.06% copper, 35.25% chromium, and 21.69% oxygen. The surface area is 24.4 sq. m./g The X-ray diffraction line pattern of the above product does not coincide with and is different from the characteristic line pattern corresponding to cuprous chromite, $Cu_2Cr_2O_4$, and to the copper-chromium oxide composition obtained according to U. S. Patent 2,512,653 as follows: A mixture of cupric acetate, chromium trioxide, and glacial acetic acid in the mole ratio of 1.0:1.0:0.7, respectively, is pasted to a semi-liquid composite and heated at 250° C. until ignition occurs spontaneously. The reaction is characterized by a pale blue flame and yields a voluminous gray-green mass. This product, after extraction with aqueous ammonium hydroxide-ammonium nitrate solution, analyzes 37.22% copper, 38.24% chromium, and 24.54% oxygen (by difference). This corresponds to $CuCr_{1.26}O_{2.62}$.

The above product is then reduced at atmospheric pressure in hydrogen for 3 hours at 390° C. at a space velocity of 2366 reciprocal hours. Analysis shows this product to contain 37.35% copper, 38.85% chromium, and 23.80% oxygen (by difference), which corresponds to $CuCr_{1.27}O_{2.53}$. The surface area of this material is 13.3 sq. m./g. X-ray analysis shows lines characteristic of cuprous chromite ($Cu_2Cr_2O_4$).

The table below gives the X-ray diffraction data in angstrom units of cupric chromite ($CuCr_2O_4$), of cuprous chromite ($Cu_2Cr_2O_4$), and of the product of the present invention, copper hemichromite ($CuCrO_2$).

Table

| Cupric Chromite ($CuCr_2O_4$) | Cuprous Chromite ($Cu_2Cr_2O_4$) | Copper Hemichromite ($CuCrO_2$) |
|---|---|---|
| 4.87 | 5.69 | 4.65 |
| 3.017 | ------ | 3.66 |
| 2.874 | 2.85 | 2.65 |
| 2.556 | 2.57 | ------ |
| 2.401 | 2.47 | 2.47 (CuO) |
| 2.134 | 2.21 | 2.41 (CuO) |
| 1.960 | 1.91 | 2.35 (CuO) |
| 1.706 | ------ | 1.67 |
| 1.629 | 1.646 | ------ |
| 1.589 | ------ | ------ |
| 1.505 | 1.488 | 1.49 |
| 1.442 | 1.439 | 1.43 |
| 1.293 | ------ | ------ |

The above data show that the X-ray diffraction line pattern of copper hemichromite does not coincide with and is not the same as the characteristic line pattern of either cupric or cuprous chromites. This fact, together with the differences in composition determined by chemical analyses indicates a new composition of matter. The above data also show that neither cupric nor cuprous chromites exhibit the characteristic X-ray diffraction line pattern of copper hemichromite and therefore that they do not contain this material.

The copper hemichromite of this invention is characterized by a transition point of 25–35° C. above which it is paramagnetic and below which it is anti-ferromagnetic. The copper chromium oxide prepared according to U. S. Patent 2,512,653 is paramagnetic under the same conditions and exhibits a decreasing but observable paramagnetism from 186° C. down to 80° K. with no anti-ferromagnetic transition temperature within this range.

The example has illustrated preparation of copper hemichromite by mixing in aqueous solution cupric acetate with chromium trioxide. Instead of mixing in aqueous solution the desired intimate association may be obtained by mixing dry copper acetate with dry chromium trioxide and homogenizing this mixture by dry grinding or by slurrying in water.

In place of cupric acetate, other copper carboxylates can be used such as cupric propionate, cupric butyrate, cupric oxalate, and the like. Alternatively, there may be used the corresponding cuprous compounds. The copper salt and chromium compound are mixed in essentially equimolar proportions.

The calcination of the mixed copper salt and chromium compound is effected at temperatures in the range of 400° to 475° C., depending upon the particular composition being calcined.

The reduction of the calcined composition can be effected with hydrogen alone. Because the reduction is an exothermic reaction, it is desirable to dilute the hydrogen with an inert gas such as nitrogen in order to moderate the reaction and thus minimize temperature control problems.

Reduction occurs satisfactorily at temperatures as low as 425° C. with hydrogen at atmospheric pressure and a space velocity of at least 500 reciprocal hours. Generally, however, better results from the standpoint of reduction rate are achieved at temperatures in the range of 450° C. to 475° C. with hydrogen admixed with nitrogen at a space velocity of 800 to 2000 reciprocal hours. The time of reduction depends upon the composition of the reducing gas and the temperature used.

Under the preferred conditions of temperature, namely, 450° to 475° C., and with a mixed gas consisting of 80% nitrogen and 20% hydrogen the time of reduction will be between 14 and 30 hours.

The copper hemichromite of this invention is a useful catalyst for hydrogenation, cyclization, alkylation, hydration, dehydrogenation, hydrogenolysis, carbonylation, and isomerization reactions, and for the conversion of carboxylic acids to acid chlorides by reaction with polyhalogenated hydrocarbons. This is illustrated as follows:

A pressure reactor which has been flushed with nitrogen is charged with 60 g. (1 mole) of acetic acid, 154 g. (1 mole) of carbon tetrachloride, and 10 g. of copper hemichromite, prepared as described in the example. The reactants are shaken and heated at 200° C. for 5 hours under autogenous pressure. After cooling the reactor is discharged and the contents filtered to remove the catalyst. There is obtained from the reaction product acetyl chloride in 8% conversion.

As many apparently widely different embodiments of this invention may be made without departing from the spirit and scope thereof, it is to be understood that this invention is not limited to the specific embodiments thereof except as defined in the appended claims.

I claim:

1. The copper hemichromite form of $CuCrO_2$ which is characterized by being brown in color, having a transition temperature of 25–35° C. above which temperature it is paramagnetic and below which temperature it is antiferromagnetic and having an X-ray diffraction line pattern with characteristic lines at 4.65, 3.66 and 2.65 angstrom units.

2. Process for preparing copper hemichromite which comprises dissolving in aqueous solution essentially equimolar proportions of a copper carboxylate and chromium trioxide, drying and calcining the precipitated product at a temperature of 400° to 475° C., then reducing in hydrogen said calcined product at a temperature of 425° to 475° C., and obtaining as the resulting product copper hemichromite.

3. Process for preparing copper hemichromite as set forth in claim 2 wherein said copper carboxylate is cupric acetate.

References Cited in the file of this patent

Mellor: "Comprehensive Treatise on Inorganic and Theoretical Chemistry," vol. 11, pages 197, 198 publ. by Longmans, Green and Co., N. Y. C., 1931.